United States Patent [19]

Suzuki et al.

[11] Patent Number: 5,005,906
[45] Date of Patent: Apr. 9, 1991

[54] RECLINING DEVICE

[75] Inventors: Yoshio Suzuki, Shioya; Kaoru Umeda; Norimasa Kitoh, both of Inuyama, all of Japan

[73] Assignees: Honda Giken Kogyo Kabushiki Kaisha, Tokyo; Kabushiki Kaisha Imasen Denki Seisakusho, Inuyama, both of Japan

[21] Appl. No.: 363,265

[22] Filed: Jun. 8, 1989

[30] Foreign Application Priority Data

| Jun. 14, 1988 | [JP] | Japan | 62-78467[U] |
| Jun. 14, 1988 | [JP] | Japan | 63-78468[U] |
| Jun. 14, 1988 | [JP] | Japan | 63-78470[U] |
| Jun. 14, 1988 | [JP] | Japan | 62-146464 |
| Jun. 14, 1988 | [JP] | Japan | 63-0146465 |

[51] Int. Cl.$^5$ .................................. B60N 2/02
[52] U.S. Cl. ................................ 297/362; 74/425
[58] Field of Search .............. 297/362, 361; 74/804, 74/805, 425, 89.14

[56] References Cited

U.S. PATENT DOCUMENTS

| 3,307,434 | 3/1967 | Kope | 74/804 |
| 4,143,905 | 3/1979 | Hensel et al. | 297/361 X |
| 4,187,933 | 2/1980 | Calabrese et al. | 74/89.14 X |
| 4,195,881 | 4/1981 | Kluting et al. | 297/367 X |
| 4,217,788 | 8/1980 | Burr et al. | 74/425 |
| 4,225,182 | 9/1980 | Werner | 297/362 |
| 4,541,294 | 9/1985 | Byers | 74/89.14 |
| 4,770,055 | 9/1988 | Chevance et al. | 74/425 X |
| 4,790,202 | 12/1988 | Hayashi et al. | 74/425 X |

FOREIGN PATENT DOCUMENTS

| 0195930 | 10/1986 | European Pat. Off. | 297/362 |
| 1094608 | 12/1960 | Fed. Rep. of Germany | 297/362 |
| 2130873 | 1/1973 | Fed. Rep. of Germany | 297/362 |
| 2039594 | 8/1980 | United Kingdom | 297/362 |

*Primary Examiner*—Jose V. Chen
*Attorney, Agent, or Firm*—Fleit, Jacobson, Cohn, Price, Holman & Stern

[57] ABSTRACT

A reclining device for vehicle seats utilizes a differential reduction gear (A) and a small size high speed motor (27) as a drive source, wherein one gear (10) having a plurality of slots (15) positioned radially outwardly from the axis of the gear is between another gear (16) having a corresponding number of slots (20) in alignment with the slots (15) in the one gear and a bracket (22) associated with the other gear (16) and held in position by rivets (12,21) through the aligned slots in the two gears to thereby regulate the adjustment range of the reclining angle. The motor output shaft (27a) and reduction gear (A) are connected by a resilient joint (35), a resilient member (32) is interposed between the motor and coupling (33) or between the coupling and reduction gear (A) to prevent oscillation and noise, and a coiled spring (43) acts on one end of the worm shaft (30a) of the reduction gear to prevent play between a worm (30) and worm gear (29).

14 Claims, 4 Drawing Sheets

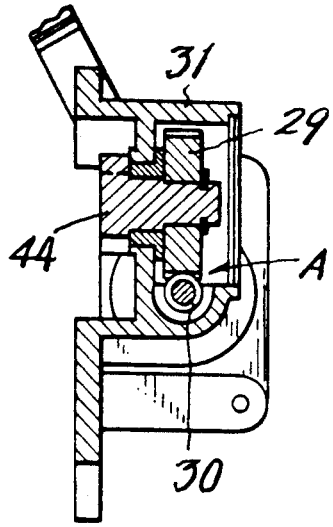
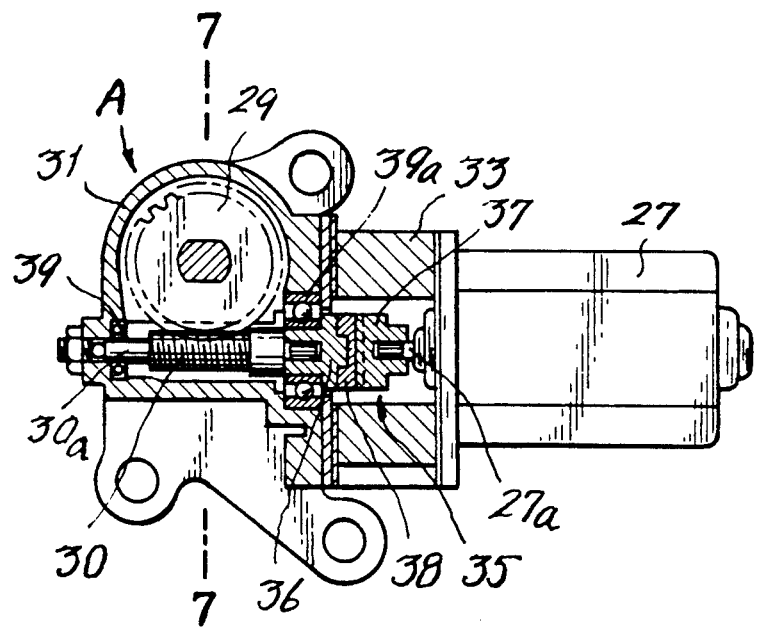
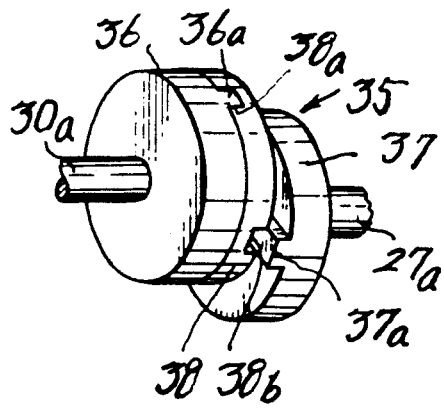
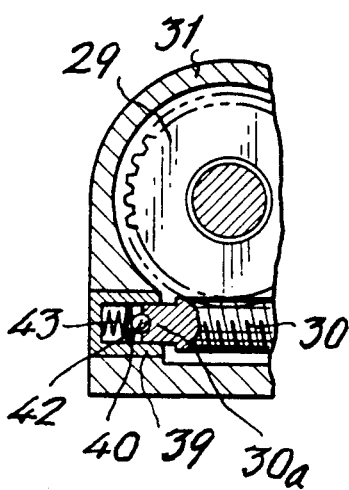
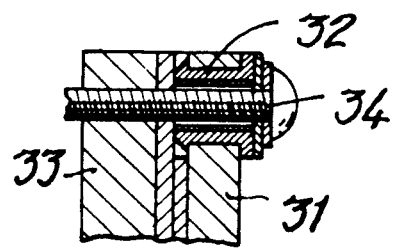

RECLINING DEVICE

BACKGROUND OF THE INVENTION

This invention relates to a reclining device wherein internal and external gears having different numbers of teeth are journalled on a common eccentric shaft and a differential reduction gear adapted to rock as the eccentric shaft rotates is employed to make a vehicular seat comfortable for seating.

One prior art reclining device employing a differential reduction gear is shown in FIG. 1. In the prior art reclining device shown in FIG. 1, the internal gear 1 is formed integrally with the bracket 2 adapted to be secured to the seat cushion, the external gear 3 is formed integrally with the bracket 4 adapted to be secured to the seat back and the internal and external gears 1 and 3 are rockably journalled on the eccentric shaft 5 while the internal and external gears are always maintaining their partially engaging condition.

Thus, when the eccentric shaft 5 is rotated, the relative position of the brackets 2, 4 varies steplessly by an angular amount corresponding to the difference in the numbers of teeth on the internal and external gears 1 and 3 to thereby perform adjusting of the reclining angle of the vehicular seat.

In the prior art reclining device described above, the internal and external gears 1 and 3 journalled on the eccentric gear 5 are indirectly and partially pinched by the bearing bracket 6, flanged pin 7 and flanged bushing 8 or partially secured to the bearing bracket, flanged pin and flanged bushing. Thus, since stresses such as impact load and twist load tend to concentrate on the internal and external gears, the gears are easily damaged. Thus, means for reinforcing the gears have to be devised. And in the prior art reclining device, the displacement of the gears in the axial direction (the horizontal plane) of the eccentric gear or oscillation of the gears 1 can not be positively prevented and the internal and external gears may not properly mesh with each other due to error occured in mounting the gears whereby the gears can not operate smoothly.

And when a small size and high speed motor or the like is employed as the drive source of the reclining device, it is advantageous that large size internal and external gears having large numbers of teeth be provided. However, in the above-mentioned prior art reclining device wherein the internal and external gears are indirectly and partially pinched by the bearing bracket, flanged pin and flanged bushing, when the internal and external gears are large in size, even if the internal and external gears are out of alignment slightly, the tips of the teeth on the gears are substantially out of alignment whereby the teeth on the gears tend to easily disengage from each other resulting in reduction in the strength of the gears.

Furthermore, the output shaft of a small size motor is small in diameter and low in supporting strength in the axial direction. And there is the drawback that when the output shaft of the motor is subjected to thrust load from a driven member, the motor shaft gets damaged. In addition, the small size motor requires a reduction gear having a large reduction ratio and oscillation noise of high frequency are produced from the motor and reduction gear to give uncomfortable noise and oscillation to the occupant to thereby make it difficult to devise counter measures for prevention of oscillation and noise.

SUMMARY OF THE INVENTION

The present invention has been developed to solve the problems inherent in the prior art reclining device referred to hereinabove. The reclining device of the present invention generally comprises an external gear adapted to be secured to a bracket associated with the seat cushion and an internal gear to be secured to a bracket associated with the seat back, and the external gear, and the internal gear having a number of teeth slightly greater than that of teeth on the external gear, are journalled on a common eccentric gear so that as the eccentric gear rotates, the internal and external gears rock relative to each other about the eccentric shaft while the internal and external gears are always maintaining their partially meshing relationship by the use of a differential reduction gear. The internal and external gears are provided with a plurality of slots in alignment with each other. The slots in each gear are positioned radially outwardly from the axis of the associated gear by the same distance and holding means such as rivets extend through the aligned slots in the two gears to pinch one of the gears and its associated bracket by the other gear and its associated bracket in a sandwich fashion to thereby prevent concentration of impact and twist loads in any particular region of each of the gears and thus, provide a reclining device which has increased strength and can be easily mounted. Another object of the present invention is to regulate the reclination adjusting range by the rivets freely extending through the aligned slots in the gears to thereby prevent the two gears from disengaging. A further object of the present invention is to prevent potential damage on the output shaft of an electric motor absorbing thrust load by a resilient joint interposed between the output shaft and reduction gear.

A still further object of the present invention is to absorb oscillation and eliminate oscillation noise by interposing a resilient member between the motor and coupling means or between the coupling means and reduction gear. A still further object of the present invention is to prevent the play of a worm shaft by causing a coiled spring to act at one end of the worm gear in the axial direction with a steel ball and an abutment plate interposed between the worm gear end coiled spring.

According to the present invention, there has been provided a reclining device for a vehicular seat which generally comprises an external gear having a number of teeth secured to a bracket associated with a seat back and an internal gear having a number of teeth slightly greater than that of teeth on said external gear secured to a bracket associated with a seat cushion and utilizing a differential reduction gear and wherein said external gear and said internal gear are journalled on a common eccentric gear having an eccentric portion and adapted to rock relative to each other while maintaining constantly and partially engaging condition as said eccentric gear rotates, characterized by the fact that one of the gears secured to the associated bracket is pinched by the other gear and the bracket to which the other gear is secured in a sandwich fashion.

BRIEF DESCRIPTION OF THE DRAWING

The above and other objects and attendant advantages of the present invention will be readily apparent to those skilled in the art from a reading of the following detailed description in conjunction with the accompanying drawings which show preferred embodiments of the invention for illustration purpose only, but do not limit the scope of the same in any way wherein:

FIG. 6 is an enlarged longitudinal partially cross sectional view showing the relationship between the small size motor for driving the reclining device and the reduction gear of FIG. 2;

FIG. 7 is a cross sectional view taken along the line 7—7 in FIG. 6;

FIG. 8 is a perspective view of the resilient joint;

FIG. 9 is a fragmentary cross sectional view showing the anti-oscillation structure of the casing and coupling means; and FIG. 10 is a fragmentary side elevational view in partial cross section of the anti-play structure of the reduction gear worm shaft.

DETAILED DESCRIPTION OF PREFERRED EMBODIMENT OF THE INVENTION

Figure 1:
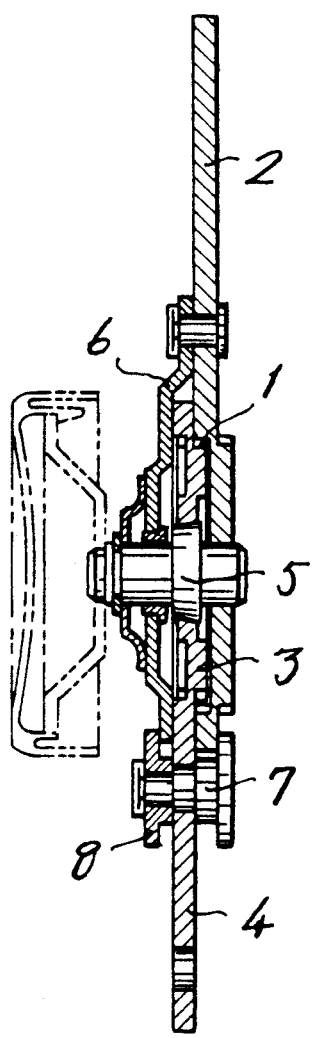
FIG. 1 is vertical cross sectional side elevational view of one prior art reclining device.
Figure 3:
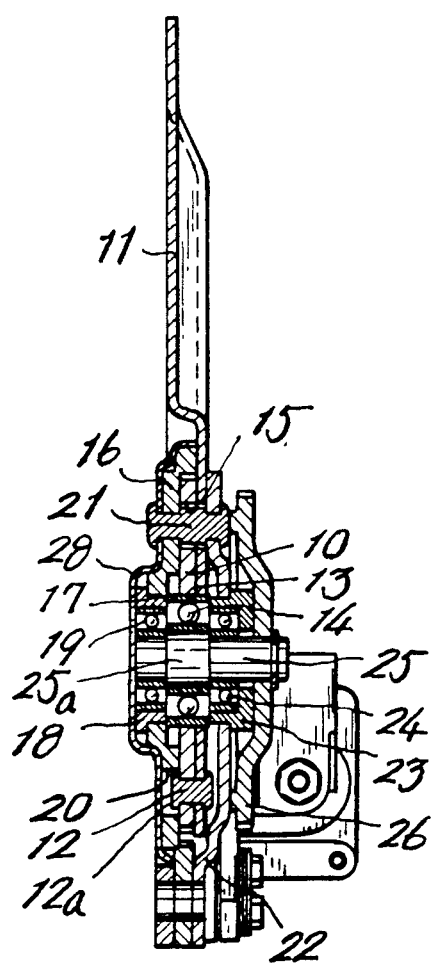
FIG. 3 is a cross sectional view taken along the line 3—3 in FIG. 2.
Figure 2:
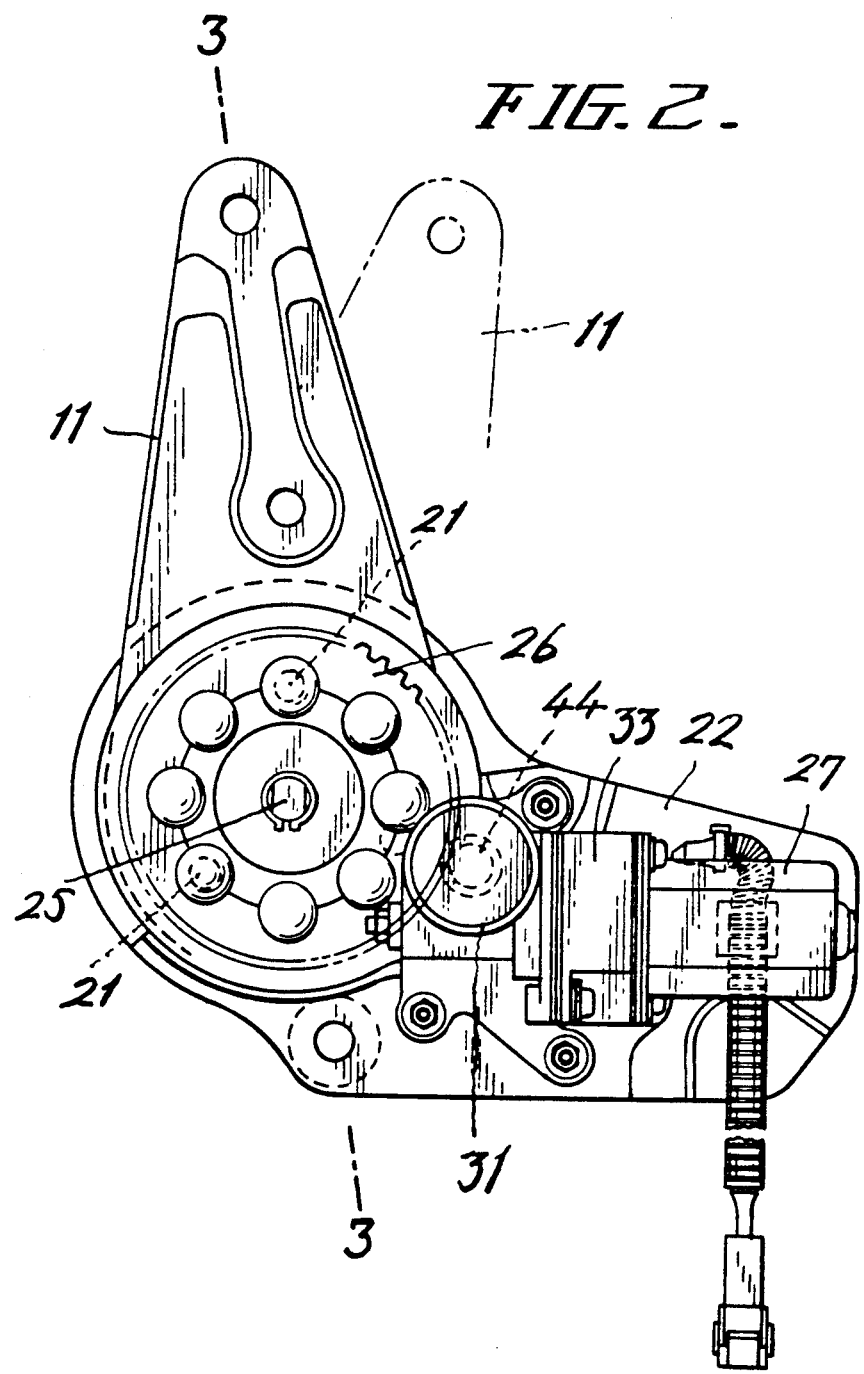
FIG. 2 is a side elevational view of one improved embodiment of the reclining device according to the present invention adapted to be driven by a small size motor.
Figure 4:
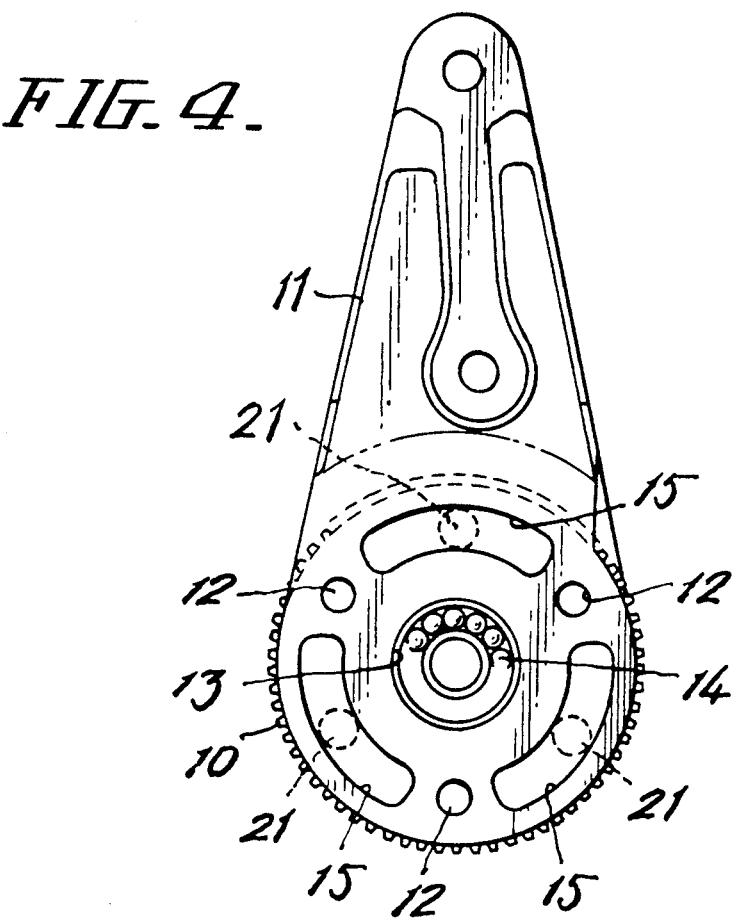
FIG. 4 is a front elevational view showing the external gear as being attached to the associated bracket of FIG. 2.
Figure 5:
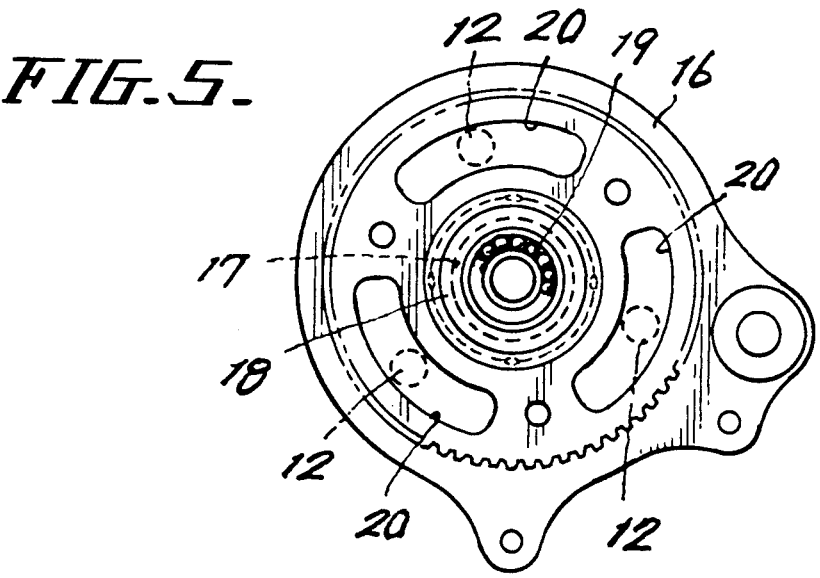
FIG. 5 is a front elevational view of the internal gear of FIG. 2.

Now, the present invention will be described referring to the accompanying drawings. An external gear 10 is fixedly secured by means of three stepped rivets 12 on a bracket 11 which is in turn fixedly secured to a seat back in a vehicle (FIGS. 2 and 4) to provide a unitary structure or assembly of the external gear 10 and bracket 11. An axial hole 13 is provided extending transversely through the external gear 10 and bracket 11 and a plurality of bearings 14 are received in the axial hole 13. As more clearly shown in FIG. 4, the external gear 10 is provided with three substantially arcuate slots 15 extending transversely through the gear in coaxial relationship to the axial hole 13 and radially outwardly spaced from the axis of the axial hole by the same distance. Reference numeral 16 denotes an internal gear which has teeth the number of which is slightly greater than that of the teeth on the external gear 10 and the internal gear 16 is adapted to always partially mesh with the external gear 10. The internal gear 16 has an axial through hole 17 in which a plurality of bearings 19 are received with a bushing 18 interposed between the axial hole 17 and bearings 19. The internal gear 16 is further provided with three substantially arcuate through slots 20 in coaxial relationship to the axial hole 17 and radially outwardly spaced from the axis of the axial hole 17 by the same distance. The slots 20 are in alignment with the slots 15 in the external gear 10. The heads of the rivets 12 which secure the external gear 10 to the bracket 11 are freely received in the slots 20 for free movement within the slots 20. The internal gear 16 has the ends of stepped rivets 21 freely received within the three slots 15 in the external gear-bracket assembly 10, 11 attached thereto and is fixedly secured to a bracket 22 associated with a vehicular seat cushion so as to pinch the external gear-bracket assembly 10, 11 in cooperation with the seat cushion bracket 22. That is, the external gear-bracket assembly 10, 11 is pinched on the opposite sides thereof by the internal gear 16 and the bracket 22 associated with the seat cushion and the arrangement is so set that the external gear 10 and internal gear 16 mesh each other in a region inwardly of the region where the external gear-bracket assembly 10, 11 is pinched by the internal gear 16 and bracket 22. The bracket 22 has a bushing 23 secured thereto and a plurality of bearings 24 are received in the bushing 23.

Supported in each of the bearings 19 and 24 received in the bushings 18 and 23, respectively is the shaft portion at each end of an eccentric shaft 25 having an eccentric portion 25a integrally formed therewith in a substantially central region of the length of the eccentric shaft 25. The shaft portions at the opposite ends of the eccentric shaft 25 are coaxial to each other. The eccentric portion 25a of the eccentric shaft 25 is supported by the bearings 14 which are in turn received in the axial hole 13 in the external gear-bracket assembly 10, 11. Thus, as the eccentric shaft 25 is rotated, the external gear-bracket assembly 10, 11 is rocked in a direction at right angles to the eccentric shaft 25 by an amount corresponding to the difference in the numbers of teeth on the external and internal gears. That is, as the eccentric shaft 25 rotates, the external gear 10 is rocked about the eccentric shaft 25 while the external gear 10 is maintaining its partially engaging relationship to the internal gear 16.

Reference 26 denotes a synthetic resin gear attached to an end of the eccentric shaft 25 projecting outwardly beyond the bracket 22. An electric motor 27 is mounted on the bracket 22 and has an output shaft to which a pinion 44 is secured. The rotational movement of the motor is transmitted in reduction through the output shaft, the pinion 44 and the synthetic resin gear 26 meshing the pinion 44 to the eccentric shaft 25. Reference numeral 28 denotes a cover plate integrally secured to the outer side of the internal gear 16 by the rivets 21.

The electric motor 27 is attached at one end to one end of a casing 31 in which a known reduction gear comprising a worm gear 29 and a worm screw 30 are received by means of bolts 34 with a resilient damper 32 formed of resilient material such as rubber or the like interposed between the motor and casing and similarly at the other end to coupling means 33 having a resilient joint received therein by the bolts 34 with a damper 32 interposed between the motor 27 and coupling means. A resilient joint 35 such as an Oldham's coupling or the like is disposed between the motor output shaft 27a and the shaft 30a of the worm 30 screw within the coupling means 33. As more clearly shown in FIG. 8, the Oldham's coupling of the resilient joint 35 comprises discs 36, 37 attached to the worm screw shaft 30a and the motor output shaft 27a, respectively, and a slidable disc 38 interposed between the discs 36, 37. The opposite sides of the slidable disc 38 are provided with grooves 38a, 38b extending and the discs 36, 37 are provided with oppositely facing convexes 36a, 37b, respectively, with a slight space left between the grooves and convexes for engaging in the grooves 38a, 38b, respectively, so that the rotational movement of the motor 27 can be smoothly transmitted through the joint 35 to the eccentric shaft 25 regardless of any misalignment between the axes of the motor shaft 27a and worm screw shaft 30a.

The worm screw shaft 30a is supported at its opposite ends by the casing 31 through bearings 39, 39a, respectively. Furthermore, as more clearly shown in FIG. 10, the worm screw shaft 30a is subjected at one end to adjusting force provided by an adjusting screw 41 with a ball 40 interposed therebetween for adjusting the shaft 30a in the axial direction and more particularly, an abutment plate 42 is positioned at the one end of the worm screw shaft 30a with a ball 40 interposed therebetween and a coiled spring 43 acts against the abutment plate 42 to push the worm screw shaft 30a inwardly in the axial direction to thereby provide an anti-play means for the worm screw shaft 30a.

As is apparent from the foregoing description, according to the present invention, when the motor 27 is driven to rotate the output shaft 27a, the output shaft in turn rotates through the resilient joint 35, the worm screw 30, the worm gear 29 and the pinion 44 to which the gear 26 is attached whereby the external gear-bracket assembly 10, 11 between internal gear 16 and bracket 22 is rocked about the eccentric shaft 25 while maintaining partial engagement between the external and internal gears 10, 16 respectively. Therefore, as the eccentric shaft 25 makes one complete rotation, the engaging region between the external and internal gears 10, 16 moves in the same direction as the eccentric shaft 25. Thus, the external gear 10 is rotated in the direction opposite to the rotational direction of the eccentric gear 25 by an amount corresponding to the difference in the numbers of teeth on the external and internal gears. That is, when the eccentric shaft 25 is rotated by the motor 27, the relative angle between the bracket 11 secured to the external gear 10 and the bracket 22 secured to the internal gear 16 can be steplessly adjusted in proportion to the number of rotations of the eccentric shaft 25 while the external gear-bracket assembly 10, 11 is being pinched by the internal gear 16 and bracket 22.

Within the ordinary range of reclining adjustment, heads 12a of the three rivets 12 which secure the external gear 10 and bracket 11 together move freely within the respectively associated slots 20 in the internal gear 16 and similarly, the three rivets 21 which secure the internal gear 16 and bracket 22 together move freely in the three slots 15 in the external gear-bracket assembly 10, 11. And since the external gear-bracket assembly 10, 11 is pinched by the internal gear 16 and bracket 22, stresses of impact load and twisting load do not concentrate on the external gear-bracket assembly 10, 11 and thus, the assembly is free of damage and reinforced. And when the positions of the rivets with respect to their associated slots have been set and the reclining angle of the vehicular seat has been adjusted to its limit of adjustment range, the rivets 12 and more particulary, the rivet heads 12a simultaneously abut against one end of the associated slots whereby stop means for limiting the reclining adjustment range for the vehicular seat is provided and disengagement of the external and internal gears is prevented.

And the deviation of the axis of the output shaft 27a of the electric motor 27 which may occur when the motor is driven is absorbed by the resilient joint 35 and slide load on the shaft is absorbed by the movement of the shaft in the axial direction to thereby protect the motor output shaft against possible damage. Furthermore, the motor 27 and the casing 31 wherein the coupling means 33 and reduction gear A are housed are connected together with the damper 32 interposed therebetween to absorb oscillation of the output shaft 27a with high frequency when the motor 27 rotates at high speed and thus, the vehicle would not produce oscillation and noise and the occupant in the vehicle will be free of discomfort during the driving of the vehicle. Still furthermore, since the movement of the worm screw 30 in the thrusting direction by the lead angle of the worm screw is arrested by the urging force provided by the coiled spring through the ball, playing of the worm can be prevented.

While one preferred embodiment of the invention has been shown and described in detail, it will be understood that the same is for illustration purpose only, and is not to be taken as a limitation thereof and reference should be made to the appended claims for that purpose.

We claim:

1. An adjustable device for a vehicle seat having a seat portion and a back portion comprising:
   a back bracket adapted to be attached to the back portion;
   an external gear on said back bracket;
   a seat bracket adapted to be attached to the seat portion;
   an internal gear on said seat bracket having a slightly greater number of gear teeth than the gear teeth on said external gear;
   an eccentric shaft having an eccentric portion thereon;
   said internal and external gears being rotatably mounted on said eccentric shaft with one of said internal and external gears being mounted on said eccentric portion, so that said internal and external gears are relatively rotatable with respect to each other by rotation of said shaft and said internal and external gear teeth engage with each other continuously over a part of each gear;
   at least one of said gears being attached to the associated bracket by rivet means;
   at least the other of said gears being disposed between said at least one gear and the associated bracket on which said one gear is mounted; and
   a plurality of slots in at least the other of said gears circumferentially spaced on the same radius, said slots extending in directions relative to said eccentric shaft and being positioned so that parts of said rivet means slidably engage in said slots to provide for said relative rotation of said gears and reclining adjustment of said seat and back portions.

2. A device as claimed in claim 1 wherein said slots have end portions engageable with said rivet means for regulating the range of relative rotation between said gears and thereby the range of reclining adjustment.

3. A device is claimed as claimed in claim 1 wherein:
   both of said internal and external gears are attached to the associated brackets by rivet means;
   said plurality of slots are provided in each gear; and
   part of said rivet means of each gear slidably engage in the slots of the other gear.

4. A device as claimed in claim 1 wherein said external gear is disposed between said internal gear and said seat bracket so that relative axial displacement between said internal and external gears is substantially prevented.

5. A device as claimed in claim 1 and further comprising:
   drive motor means for rotating said eccentric shaft;
   an output shaft on said drive motor means;
   reduction gear means having an output connected to said eccentric shaft and an input; and resilient coupling means connecting said drive motor output shaft to said input of said reduction gear means.

6. A device as claimed in claim 5 and further comprising:
damper means operatively mounted between said coupling means and said input of said reduction gear means.

7. An adjustable device for a vehicle seat having a seat portion and a back portion comprising:
a back bracket adapted to be attached to the back portion;
an external gear on said back bracket;
a seat bracket adapted to be attached to the seat portion;
an internal gear on said seat bracket having a slightly greater number of gear teeth than the gear teeth on said external gear;
an eccentric shaft having an eccentric portion thereon;
said internal and external gears being rotatably mounted on said eccentric shaft with one of said internal and external gears being mounted on said eccentric portion, so that said internal and external gears are relatively rotatable with respect to each other by rotation of said shaft and said internal and external gear teeth engage with each other continuously over a part of each gear;
at least one of said gears being attached to the associated bracket by rivet means;
at least the other of said gears being disposed between said at least one gear and the associated bracket on which said one gear is mounted; and
a plurality of arcuate shaped slots in at least the other of said gears circumferentially spaced on the same radius, said slots being positioned so that parts of said rivet means slidably engage in said slots.

8. An adjustable device for a vehicle seat having a seat portion and a back portion comprising:
a back bracket adapted to be attached to the back portion;
an external gear on said back bracket;
a seat bracket adapted to be attached to the seat portion;
an internal gear on said seat bracket having a slightly greater number of gear teeth than the gear teeth on said external gear;
an eccentric shaft having an eccentric portion thereon;
said internal and external gears being rotatably mounted on said eccentric shaft with one of said internal and external gears being mounted on said eccentric portion, so that said internal and external gears are relatively rotatable with respect to each other by rotation of said shaft and said internal and external gear teeth engage with each other continuously over a part of each gear;
said gears being attached to the associated brackets by rivet means;
one of said gears being disposed between at least the other gear and the associated bracket on which said other gear is mounted; and
a plurality of arcuate shaped slots in each gear circumferentially spaced on the same radius, said slots being positioned so that parts of said rivet means of each gear slidably engage in said slots of the other gear.

9. A device as claimed in claim 8 wherein said slots have end portions engageable with said rivet means for regulating the range of relative rotation between said gears and thereby the range of reclining adjustment.

10. A device as claimed in claim 9 wherein said external gear is disposed between said internal gear and said seat bracket so that relative axial displacement between said internal and external gears is substantially prevented.

11. A device as claimed in claim 10 and further comprising:
drive motor means for rotating said eccentric shaft;
an output shaft on said drive motor means;
reduction gear means having an output connected to said eccentric shaft and an input; and
resilient coupling means connecting said drive motor output shaft to said input of said reduction gear means.

12. A device as claimed in claim 11 and further comprising:
damper means operatively mounted between said coupling means and said input of said reduction gear means.

13. A device as claimed in claim 12 wherein said reduction gear means comprises:
a housing;
an input worm screw rotatably mounted in said housing;
an output worm gear engaging said worm screw;
a ball member at one end of said worm screw;
a movable abutment member in said housing engaging said ball member on the side of said ball member opposite to said one end of said worm screw; and
a coiled spring means between said housing and said abutment member for resiliently urging said abutment member against said ball member for substantially preventing play between said worm screw and said worm gear.

14. An adjustable device for a vehicle seat having a seat portion and a back portion comprising:
a back bracket adapted to be attached to the back portion;
an external gear on said back bracket;
a seat bracket adapted to be attached to the seat portion;
an internal gear on said seat bracket having a slightly greater number of gear teeth than the gear teeth on said external gear;
an eccentric shaft having an eccentric portion thereon;
said internal and external gears being rotatably mounted on said eccentric shaft with one of said internal and external gears being mounted on said eccentric portion, so that said internal and external gears are relatively rotatable with respect to each other by rotation of said shaft and said internal and external gear teeth engage with each other continuously over a part of each gear;
at least one of said gears being attached to the associated bracket by rivet means;
at least the other of said gears being disposed between said at least one gear and the associated bracket on which said one gear is mounted;
a plurality of slots in at least the other of said gears circumferentially spaced on the same radius, said slots being positioned so that parts of said rivet means slidably engage in said slots;

drive motor means for rotating said eccentric shaft;
an output shaft on said drive motor means;
reduction gear means having an output connected to said eccentric shaft and an input, said reduction gear comprising,
  a housing,
  an input worm screw rotatably mounted in said housing,
  an output worm gear engaging said worm screw,
  a ball member at one end of said worm screw,
  a movable abutment member in said housing engaging said ball member on the side of said ball member opposite to said one end of said worm screw, and
  a coiled spring means between said housing and said abutment member for resiliently urging said abutment member against said ball member for substantially preventing play between said worm screw and said worm gear; and
resilient coupling means connecting said drive motor output shaft to said input of said reduction gear means.

* * * * *

UNITED STATES PATENT AND TRADEMARK OFFICE
CERTIFICATE OF CORRECTION

PATENT NO. : 5,005,906

DATED : April 9, 1991

INVENTOR(S) : YOSHIO SUZUKI et al

It is certified that error appears in the above-identified patent and that said Letters Patent is hereby corrected as shown below:

On the Title Page, under the heading "Foreign Applications Priority Data," please amend it as follows:

> first priority document, delete [62-78467[U]], and insert --63-78467[U]--;
>
> fourth priority document, delete [62-146464] and insert --63-146464--.

Signed and Sealed this

Twentieth Day of October, 1992

Attest:

DOUGLAS B. COMER

*Attesting Officer*     *Acting Commissioner of Patents and Trademarks*